(12) United States Patent
Wilczynski et al.

(10) Patent No.: US 11,586,660 B2
(45) Date of Patent: Feb. 21, 2023

(54) DETERMINING OBJECT GEOLOCATIONS BASED ON HETEROGENEOUS DATA SOURCES

(71) Applicant: Palantir Technologies Inc., Palo Alto, CA (US)

(72) Inventors: Peter Wilczynski, San Francisco, CA (US); Andrew Elder, New York, NY (US); Anand Gupta, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/871,890

(22) Filed: May 11, 2020

(65) Prior Publication Data

US 2021/0034653 A1 Feb. 4, 2021

Related U.S. Application Data

(60) Provisional application No. 62/880,805, filed on Jul. 31, 2019.

(51) Int. Cl.
*G06F 7/00* (2006.01)
*G06F 16/36* (2019.01)
(Continued)

(52) U.S. Cl.
CPC .......... *G06F 16/367* (2019.01); *G06F 16/182* (2019.01); *G06F 16/2322* (2019.01);
(Continued)

(58) Field of Classification Search
CPC .... G06F 16/182; G06F 16/334; G06F 16/387; G06F 16/2322; G06F 16/338; G06N 5/025
(Continued)

(56) References Cited

U.S. PATENT DOCUMENTS 9,560,426 B1 1/2017 Daniel
9,600,146 B2 3/2017 Cervelli et al.
(Continued)

FOREIGN PATENT DOCUMENTS

WO 2015069320 A2 5/2015

OTHER PUBLICATIONS

EPO Search Report for EP Application No. 20189017.5-1231, dated Sep. 11, 2020, 7 pages.
(Continued)

*Primary Examiner* — Md I Uddin
(74) *Attorney, Agent, or Firm* — Lowenstein Sandler LLP

(57) ABSTRACT

An example method of determining geolocations of objects based on information retrieved from heterogeneous data sources comprises: receiving, from a first data source associated with an object by an ontology-defined relationship, a first dataset including a first data item specifying a first time identifier and a first geolocation associated with the object; receiving, from a second data source associated with an object by an ontology-defined relationship, a second dataset including a second data item specifying a second time identifier and a second geolocation associated with the object; and determining, by applying a rule set associated with the ontology to the first dataset and the second dataset, a geolocation of the object and a corresponding time identifier.

11 Claims, 10 Drawing Sheets

(51) Int. Cl.
    *G06F 16/182* (2019.01)
    *G06F 16/33* (2019.01)
    *G06F 16/387* (2019.01)
    *G06F 16/23* (2019.01)
    *G06F 16/338* (2019.01)
    *G06N 5/025* (2023.01)

(52) U.S. Cl.
    CPC .......... *G06F 16/334* (2019.01); *G06F 16/338* (2019.01); *G06F 16/387* (2019.01); *G06N 5/025* (2013.01)

(58) Field of Classification Search
    USPC ................ 707/705, 723, 770, 706, 722, 736
    See application file for complete search history.

(56) References Cited

U.S. PATENT DOCUMENTS

| | | | |
|---|---|---|---|
| 9,612,723 | B1 | 4/2017 | Elliot et al. |
| 9,824,591 | B1 | 11/2017 | Ryan et al. |
| 10,089,289 | B2 | 10/2018 | Sood et al. |
| 10,268,735 | B1 | 4/2019 | White et al. |
| 10,373,099 | B1 | 8/2019 | McCardel et al. |
| 10,572,576 | B1 | 2/2020 | Marc-Aurele et al. |
| 10,754,822 | B1 | 8/2020 | Patil |
| 11,086,640 | B2 | 8/2021 | Elliot et al. |
| 2008/0010272 | A1 | 1/2008 | Schickel-Zuber et al. |
| 2013/0314210 | A1 | 11/2013 | Schoner et al. |
| 2015/0057981 | A1* | 2/2015 | Gross ...................... G01S 19/48 703/1 |
| 2015/0100589 | A1 | 4/2015 | Hassan et al. |
| 2015/0170077 | A1 | 6/2015 | Kara |
| 2018/0350180 | A1 | 12/2018 | Onischuk |
| 2019/0158301 | A1 | 5/2019 | Marzorati et al. |
| 2020/0364953 | A1* | 11/2020 | Simoudis ............... G07C 5/085 |

OTHER PUBLICATIONS

EPO Search Report for EP Application No. 20189015.9-1231, dated Sep. 11, 2020, 7 pages.
EP Examination Report for Application No. 20189017.5, dated Jan. 14, 2022, 5 pages.
EP Examination Report for Application No. 20189015.9, dated Jan. 13, 2022, 6 pages.
USPTO, First Action Interview Office Action for U.S. Appl. No. 16/871,912, dated Dec. 13, 2021.
USPTO, Final Office Action for U.S. Appl. No. 16/871,912, dated Mar. 16, 2022.
USPTO, Advisory Action for U.S. Appl. No. 16/871,912, dated Jun. 9, 2022.
USPTO, Office Action for U.S. Appl. No. 16/871,912, dated Sep. 14, 2022.

* cited by examiner

Fig. 6

DETERMINING OBJECT GEOLOCATIONS BASED ON HETEROGENEOUS DATA SOURCES

RELATED APPLICATIONS

This application claims the benefit of U.S. Provisional Application No. 62/880,805, filed Jul. 31, 2019.

TECHNICAL FIELD

This disclosure is related to distributed computing systems, and in particular to determining geolocations of elementary and composite objects based on information retrieved from heterogeneous data sources.

BACKGROUND

Numerous business or leisure applications may receive and process geolocation data for various real-world entities. The geolocation data may be in the form of one or more alphanumeric strings representing geographic coordinates in a chosen geographic coordinate system.

BRIEF DESCRIPTION OF THE DRAWINGS

The present disclosure will be understood more fully from the detailed description given below and from the accompanying drawings of various implementations thereof, which, however, should not be taken to limit the present disclosure to the specific implementations, but are for explanation and understanding only.

FIG. 6 schematically illustrates the main screen of the browser application which may be hosted by an application platform, in accordance with one or more aspects of the present disclosure.

DETAILED DESCRIPTION

Figure 1:
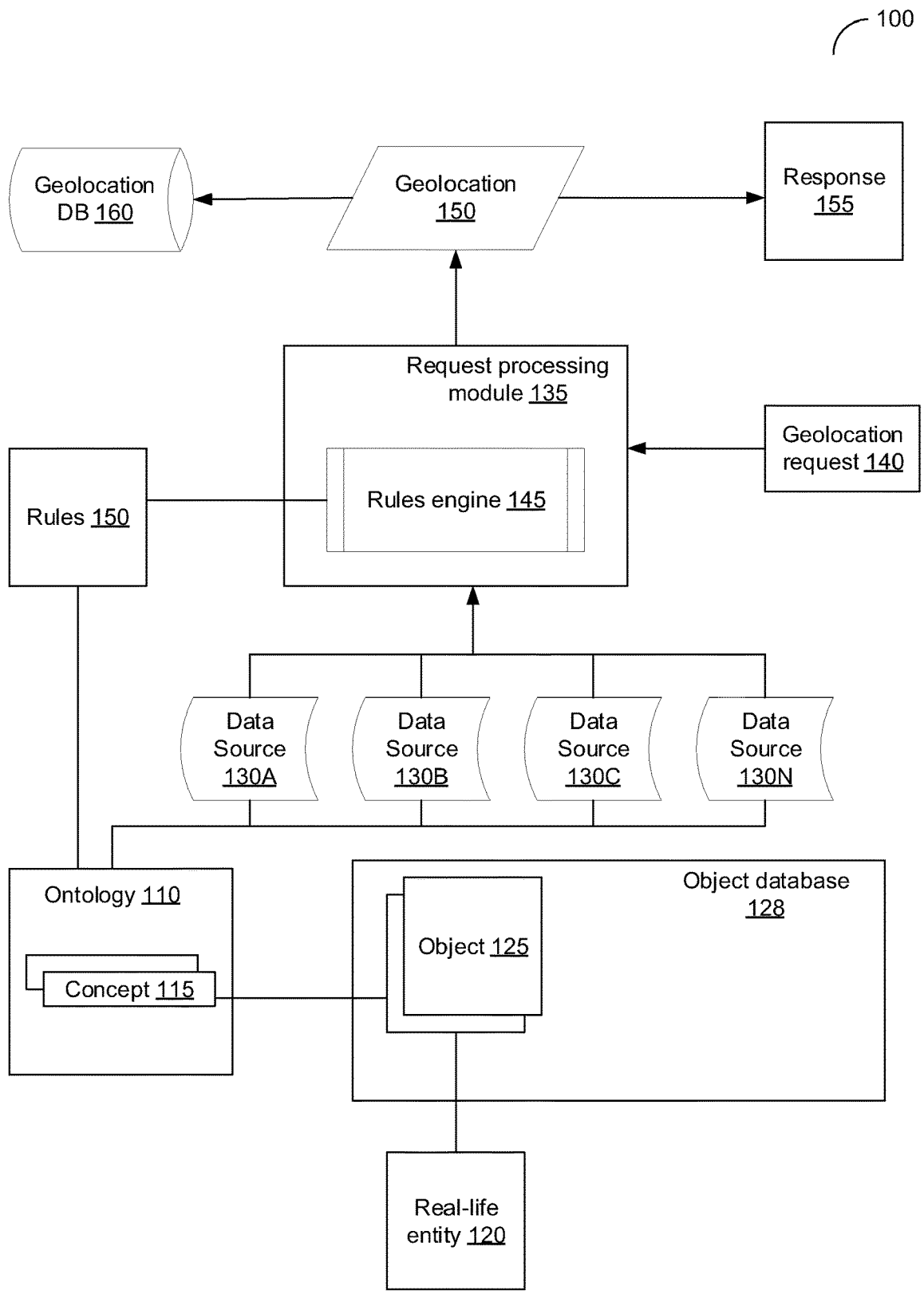
FIG. 1 schematically illustrates an example system for determining a geolocation of an entity based on multiple heterogeneous data sources, implemented in accordance with one or more aspects of the present disclosure.

The following description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure are directed to determining geolocations of elementary and composite objects based on information retrieved from heterogeneous data sources. Various applications, such as applications hosted by the application platform 502 of FIG. 5 (e.g., an interactive communication application, a project management application, a collaboration application, and/or any other application that may use interactive maps in its graphical user interface) may employ an ontology-based object model for representing the real world entities of interest. "Ontology" herein shall refer to a hierarchical set of concepts (also referred to as "classes" in the object-oriented parlance) that belong to a certain subject matter domain, together with their properties and relationships between them. Hierarchical aspects of an ontology may be expressed by parent-child relationships between its concepts.

A given real-life entity may be represented in an application by an "object," which is an instance of a corresponding ontology concept. The object may be associated with a set of attributes representing values of the properties that are defined for the concept by the ontology, and may be in one or more ontology-defined relationships with other objects. Accordingly, an application may instantiate and manipulate objects of various classes in order to represent various real-life entities for delivering its intended functionality. In an illustrative example, an employee may be represented by an object of a class "Employee," which, by virtue of being a child of a class "Person," may inherent the properties of the parent class.

An entity may have one or more attributes that change over time, e.g., attributes that reflect their geolocations. While collecting and storing geolocation data from various sensors, conventional systems generally fail to associate the collected data with real-world entities, such as persons or organization. Conversely, systems and methods of the present disclosure may determine the geolocation of a given object at a certain point in time based on heterogeneous data collected from multiple sensors associated with the object by the relationships that are specified by the ontology. In particular, the geolocation of an object at the specified point in time may be determined based on the data streams received from a global positioning system (GPS) unit installed in a car or in a smartphone operated by the person, a video stream in which images representing the person have been recognized, etc. For example, an interactive communication application may display, on a map, locations of two or more persons engaged in an interactive communication session. In another example, an interactive collaboration application may display, on a map, locations of various persons and/or teams participating in a collaborative effort, combined with locations of various objects of interest (e.g., offices, plants, warehouses, etc.).

In order to determine the geolocation of a given object (such as an object representing a person) at a specified point in time, a computer system implementing systems and methods of the present disclosure may identify one or more geolocation data sources associated with the entity by one or more ontology-defined relationships. For example, the computer system may determine that the person of interest carries a mobile phone equipped with a GPS unit and operates a car equipped with a GPS navigator. Accordingly, timestamped geolocation data for each of the two data sources may be retrieved from the respective geolocation databases. In another example, the computer system may retrieve, from a database, an image of the person of interest and attempt to match the image to one or more timestamped video streams that were captured at known geolocations. The computer system may then employ various rule sets and/or other methods (such as machine learning-based models) in order to determine, based on the relevant geolocation information retrieved from multiple heterogeneous data sources, the geolocation of the person at the specified point in time.

Systems and methods described herein may also be applied to determining geolocation of composite objects (i.e., objects representing composite entities). "Composite entity" herein shall refer to an entity that includes other entities (composite entities and/or elementary entities): for example, an organization may include organization units, which in turn may include persons. Conversely, "elementary entity" herein shall refer to an entity that does not include other entities. Accordingly, geolocations of composite objects may be inferred from geolocations of their constituents. For example, the computer system may identify one or more constituent objects associated with a composite object by one or more ontology-defined relationships. Such associations may be stable (e.g., an employee may be a part of an organizational unit, which in turn is a part of an organization) or transient (e.g., a person may participate in a short-term event, such as a conference). The computer system may then identify one or more geolocation data sources associated with each of the constituent entities by one or more ontology-defined relationships. The computer system may then employ various rule sets and/or other methods (such as machine learning-based models) in order to determine, based on the relevant geolocation information retrieved from multiple heterogeneous data sources, the geolocation of the composite object, as described in more detail herein below.

Thus, the systems and methods described herein solve the technical problem of identifying locations of various objects at specified periods or points in time based on processing information from heterogeneous data sources that may be associated with the objects of interest by ontology-defined relationships. Furthermore, the systems and methods described herein may efficiently store, in a geolocation database, the location information in association with other object-related information stored in an object database. Furthermore, the systems and methods described herein may efficiently utilize the stored and/or computed geolocation information for servicing geolocation requests from various client applications that may be unaware of the underlying logic, rule sets, and heterogeneous data sources utilized from computing the geolocation information.

The methods described herein may be implemented by hardware (e.g., general purpose and/or specialized processing devices, and/or other devices and associated circuitry), software (e.g., instructions executable by a processing device), or a combination thereof.

FIG. 1 schematically illustrates an example system 100 for determining a geolocation of an entity based on multiple heterogeneous data sources, implemented in accordance with one or more aspects of the present disclosure. System 100 may operate on a set of objects representing various real-life entities, such that each object is an instance of a class representing a concept of a base ontology 110, which may include a hierarchical set of concepts 115 that belong to a certain subject matter domain, together with their properties and relationships between them. Thus, in system 100, every real-life object of interest may be represented by an instance of a concept of the base ontology 110.

For example, a real-life entity 120 may be associated with a concept 115 of the ontology 110 (e.g., the real-life entity 120 may be an individual, and the corresponding concept 115 may be "Person"). Accordingly, the real-life entity 120 may be represented by an object 125, which is an instance of the ontology concept 115. The object 125 may have a set of attributes representing values of the properties that are defined for the corresponding concept 115 by the ontology 110, and may be associated with other objects by one or more relationships specified by the ontology 110. In some implementations, the object 125, along with other objects, their attributes, and relationships, may be stored in the object database 128.

Hierarchical aspects of an ontology may be expressed by parent-child relationships between its concepts. While hierarchical relationships of ontology concepts are not shown in FIG. 1 for clarity and conciseness, it should be noted that a given ontology concept may be associated with one or more parent concepts, and thus the properties of such a concept may include a union of respective sets of properties associated with each of the parent concepts. In some implementations, hierarchical relationships between ontology concepts (e.g., "includes," "included by," etc.) may reflect various associations between constituents of a composed entity, as described in more detail herein below with reference to FIG. 3.

The ontology 110 may identify one or more data sources 130A-130N associated, by relationships of one or more of ontology-defined types, with the object 125. For example, the data source 130A may be a database storing timestamped geolocation records for a smartphone that is carried by the person represented by object 130; the data source 130B may be a database storing timestamped geolocation records for a car that is operated by the person; the data source 130C may be a database storing timestamped and geotagged video streams acquired by mobile cameras; the data source 130N may be a database storing timestamped video streams acquired by stationary cameras with known geolocations, etc.

The geolocation request processing server 135 may implement a representational state transfer (RESTful) protocol for servicing geolocation requests from various client applications, which are omitted from FIG. 1 for clarity and conciseness. A geolocation request may include one or more parameters specifying an identifier of the object of interest, an identifier of the time point or period for which the geolocation(s) of the object of interest is sought, etc. Responsive to receiving the geolocation request 140, the geolocation request processing server 135 may parse the parameters of the geolocation request 140 to identify the object 125 and the time specified by the geolocation request 140. In some implementations, parameters of the geolocation request may be represented by <name=value> pairs (e.g., <object_id=object123>, <time=1560982961>).

The geolocation request processing server 135 may then invoke the rules engine 145, which implements one or more sets of rules 150 associated with the ontology 110, in order to identify one or more data sources 130A-130N that are associated, directly or through other objects, with the object 125 by relationships of one or more ontology-defined types, as described in more detail herein below with reference to FIG. 2. Upon identifying the relevant data sources 130A-130N, the geolocation request processing server 135 may invoke the rules engine 145 in order to extract, from the identified data sources 130A-130N, the geolocation information of the object 125 for the point of time or the period of time specified by the geolocation request 140. The rules engine 145 may then process the extracted geolocation information and determine the geolocation 150 of the object 125 for the point of time or the period of time specified by the geolocation request 140.

It should be noted that while the examples described herein reference the rules engine 145, in various other implementations the geolocation request processing server 135 may, additionally or alternatively, employ other technologies for identifying relevant data sources and/or processing the geolocation information extracted from the identified data sources. For example, the geolocation request processing server 135 may employ trainable classifiers, artificial neural networks, and/or other machine learning-based methods for identifying the relevant data sources and/or processing the geolocation information extracted from the identified data sources.

Upon determining the geolocation 150 of the object of interest, the geolocation request processing server 135 may generate a geolocation response 155, which may be returned to the requesting client application. In some implementations, a record reflecting the geolocation response 145 may be appended to the geolocation database 160, which may serve as a cache for storing the geolocation data extracted from the data sources 125 in response to incoming geolocation requests. Accordingly, in some implementations, the geolocation database may be queried by the geolocation request processing server 135 in an attempt to service an incoming geolocation request using the cached geolocation data without invoking the rules engine 145. Accordingly, the rules engine 145 would only be invoked in the "cache miss" situation, i.e., if the incoming geolocation request cannot be serviced based on the information stored in the geolocation database 160.

Figure 2:
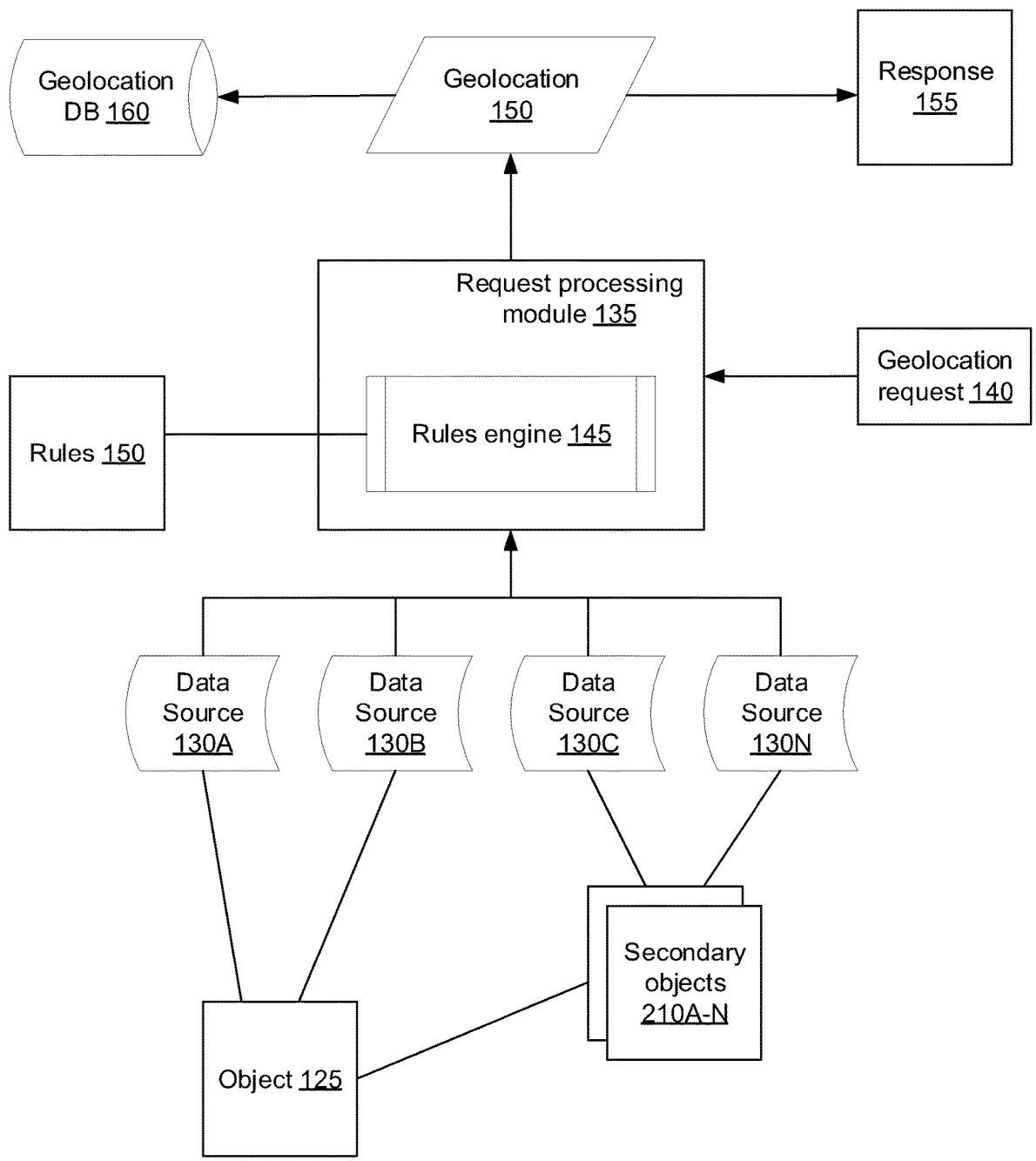
FIG. 2 schematically illustrates identifying the data sources for extracting geolocation information for the object of interest, in accordance with one or more aspects of the present disclosure.

FIG. 2 schematically illustrates identifying, by the rules engine 145, one or more data sources for extracting geolocation information for the object of interest, in accordance with one or more aspects of the present disclosure. As shown in FIG. 2, the object of interest 125 may be associated, by relationships of one or more types specified by the ontology 110, with one or more secondary objects 210A-210N. For example, the types of relationships may indicate a stable or a transient physical association of the object of interest 125 with one or more secondary objects 210A-210N (e.g., "possesses," "uses," "carries," "rides," "collocated with," "visits," "stays at," etc.), such that the location of the object of interest 125 may, at least at certain times, match a location of a secondary object 210 (e.g., a person may carry a mobile phone equipped with a GPS sensor and/or ride a car equipped with a GPS navigator).

The identified secondary objects 210A-210N may, in turn, be associated, by relationships of one or more types specified by the ontology 110, with one or more data sources 130A-130K. For example, a type of relationship (e.g., "location tracked by") may indicate a stable or a transient association of a secondary object 210 with a data source 130 that contains geolocation data.

Additionally or alternatively, the object 125 may be associated, by relationships of one or more types specified by the ontology 110, with one or more data sources 130L-130N. For example, a type of relationship (e.g., "location tracked by") may indicate a stable or a transient association of the object of interest 125 with a data source 130 that contains geolocation data.

Accordingly, in some implementations, one or more rules 150 may specify one or more types of relationships through which the object of interest 125 may be associated with relevant data sources 125. For example, relationships of the specified types may be indicative of a stable or a transient association of the object of interest with a data source (e.g., "location tracked by"). Accordingly, the rules engine may utilize the rules to identify one or more data sources that are directly associated by one or more relationships of the specified types with the object of interest.

Additionally or alternatively, one or more rules 150 may specify one or more types of relationships through which the object of interest 125 may be associated with one or more secondary objects. For example, relationships of the specified types may be indicative of a stable or a transient physical association of the object of interest with a secondary object (e.g., "possesses," "uses," "carries," "rides," "collocated with," "visits," "stays at," etc.). Furthermore, one or more rules 150 may specify one or more types of relationships through which a secondary object may be associated with relevant data sources 125. For example, relationships of the specified types may be indicative of a stable or a transient association of the object of interest with a data source (e.g., "location tracked by"). Accordingly, the rules engine may select, among the identified secondary objects, one or more secondary objects that are associated with data sources by one or more relationships of predefined types.

Upon extracting the geolocation information, the geolocation request processing server 135 may invoke the rules engine 145 in order to process the extracted geolocation information and determine the geolocation 150 of the object 125 for the point of time or the period of time specified by the geolocation request 140.

In some implementations, one or more rules 150 may be utilized for computing the geolocation of the object of interest by interpolating or extrapolating the geolocation data retrieved from one or more data sources. For example, the geolocation data of the object of interest for the specified point of time or the period of time may be missing from the available data sources, which may instead contain the geolocation data for the object of interest for at least one moment in time before the specified point of time or the period of time and for at least one moment in time after the specified point of time or the period of time. Accordingly, the geolocation request processing server 135 may compute the geolocation of the object of interest 125 for the specified point of time or the period of time by interpolating the two available geolocation data items (e.g., by performing linear interpolation). It should be noted that higher-order interpolation may be performed based on three or more geolocation data items lying on the time axis on the different sides of the specified point of time or the period of time.

In another example, the geolocation data of the object of interest for the specified point of time or the period of time may be missing from the available data sources, which may instead contain the geolocation data for the object of interest for two or more distinct points in time either before or after the specified point of time or the period of time. Accordingly, the geolocation request processing server 135 may compute the geolocation of the object of interest 125 for the specified point of time or the period of time by extrapolating the two available geolocation data items (e.g., by performing linear extrapolation). It should be noted that a higher-order extrapolation may be performed if three or more geolocation data items are available which precede or follow the specified point of time or the period of time (e.g., quadratic extrapolation may be performed based on at least three geolocation data items, cubic extrapolation may be performed based on at least three geolocation data items, etc.)

In some implementations, one or more rules 150 may define a function for determining priority values to the identified data sources. For example, the geolocation request processing server 135 may compute the priority value for a given data source by applying a priority function specified by one or more rules 150 to one or more attributes of the data source, one or more attributes of the object of interest, and/or one or more attributes of the relationship between the data source and the object of interest. The priority values may be utilized for resolving eventual conflicts between geolocation data items retrieved from two or more data sources. For example, the geolocation request processing server 135 may compute the first geolocation of the object of interest 125 for the specified point of time or the period of time based on the geolocation information retrieved from the first data source, and may further compute the second geolocation of the same object for the sane point of time or the period of time based on the geolocation information retrieved from the second data source. Responsive to determining that the first geolocation differs significantly from the second geolocation, the geolocation request processing server 135 may produce the geolocation response based on the geolocation that was derived from the geolocation data retrieved from the data source having the lowest priority value among the identified data sources.

In some implementations, one or more rules 150 may define a function for calculating the confidence value associated with the computed geolocation of the object of interest for the specified point of time or the period of time. For example, the geolocation request processing server 135 may compute the confidence value for a given data source by applying a confidence function specified by one or more rules 150 to one or more attributes of the data source, one or more attributes of the object of interest, and/or one or more attributes of the relationship between the data source and the object of interest.

As noted herein above, upon determining the geolocation 150, the geolocation request processing server 135 may generate a geolocation response 155, which may be returned to the requesting client application. In some implementations, a record reflecting the geolocation response 145 may be appended to the geolocation database 160.

In some implementations, the computed geolocations of a moving object may be utilized for triggering geofencing alerts. A geofencing alert is an alert (e.g., in the form of a notification sent to a user via a communication network) that is triggered when an object of interest moves into, leaves, approaches by a threshold distance, or moves at least a threshold distance from a specified location. For example, a geofencing alert may be triggered when a person leaves or enters a certain building. The alert triggering conditions may be specified by one or more configurable rules. An alert may be triggered in a form of a message sent over a communication network to one or more specified recipients.

Furthermore, in some implementations, the computed geolocations of a moving object may be utilized as a dynamic geofence. A dynamic geofencing alert is a geofencing alert that is triggered when one object of interest moves into, leaves, approaches by a threshold distance, or moves at least a threshold distance from a location of another object of interest that acts as the dynamic geofence. For example, a dynamic geofencing alert may be triggered when one person of interest approaches another person of interest that acts as the dynamic geofence.

Figure 3:
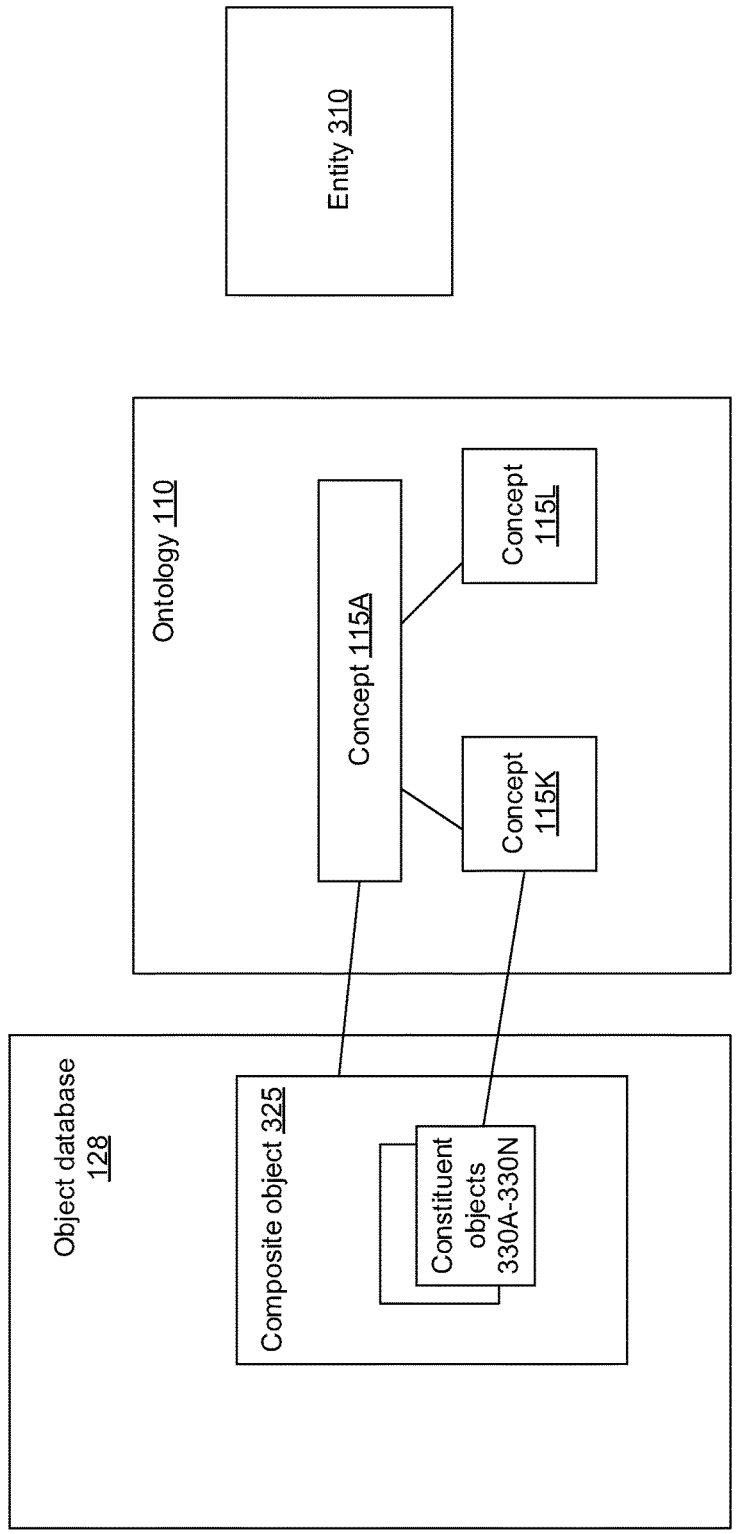
FIG. 3 schematically illustrates identifying a plurality of constituent objects associated with a composite entity, in accordance with one or more aspects of the present disclosure.

As noted herein above, the systems and methods described herein may also be utilized for determining geolocations of objects representing composite entities, i.e., entities that include other entities (composite entities and/or elementary entities). For example, an organization may include organization units, which in turn may include persons. Accordingly, geolocations of composite objects may be inferred from geolocations of their constituents. FIG. 3 schematically illustrates identifying, by the geolocation request processing server 135, a plurality of constituent objects associated with a composite entity, in accordance with one or more aspects of the present disclosure. As shown in FIG. 3, a real-life composite entity 310 may be associated with a concept 115A of the ontology 110 (e.g., the entity 310 may be a corporation, and the corresponding concept 115A may be "Organization"). The concept 315 may be associated, by one or more relationships of ontology-specified types (e.g., "includes," "included by," etc.), with one or more concepts 115K-115L, which may correspond to the constituent objects 330A-330N of the composite object 325.

Accordingly, the real-life entity 310 may be represented by an object 325, which is an instance of the ontology concept 115A. The object 325 may be associated, by one or more relationships of ontology-specified types, with one or more constituent objects 330A-330N, each of which is an instance of an ontology concept 115K-115L respectively. Such associations may be stable (e.g., an employee may be a part of an organizational unit, which in turn is a part of an organization) or transient (e.g., a person may participate in a short-term event, such as a conference). The object 325 may further have a set of attributes representing values of the properties that are defined for the corresponding concept 315 by the ontology 110, and may be in one or more ontology-defined relationships with other objects, which are omitted from FIG. 3 for clarity and conciseness. Object 325 and 330A-330N, along with other objects, their attributes, and relationships, may be stored in the object database 128.

Figure 4:
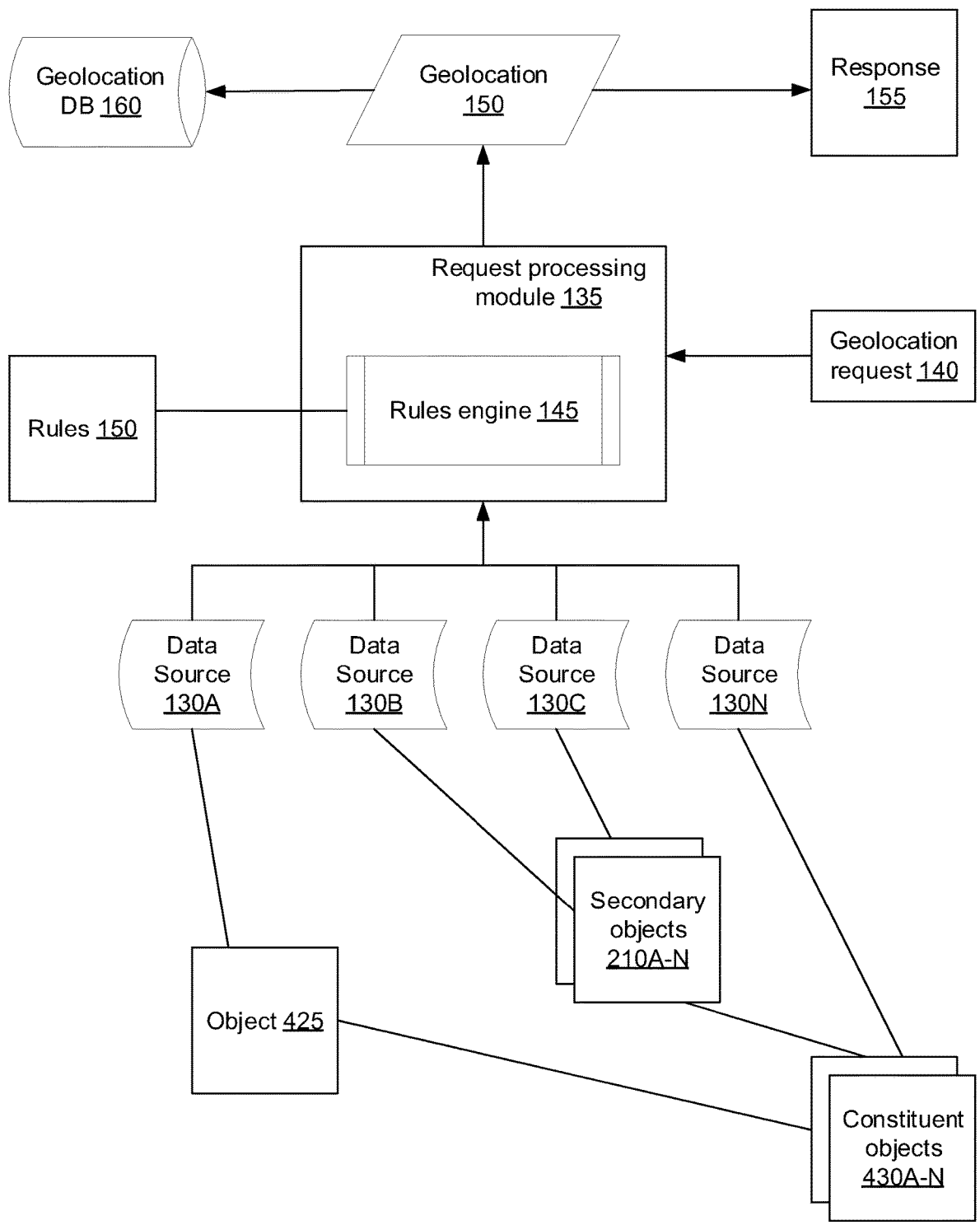
FIG. 4 schematically illustrates identifying the data sources for extracting geolocation information for an object of interest representing a composite entity, in accordance with one or more aspects of the present disclosure.

FIG. 4 schematically illustrates identifying one or more data sources for extracting geolocation information for an object of interest representing a composite entity, in accordance with one or more aspects of the present disclosure. As shown in FIG. 4, the composite object of interest 425 may be associated, by one or more relationships of ontology-specified types, with one or more constituent objects 430A-430N. Accordingly, in some implementations, one or more rules 150 may specify one or more types of relationships through which the object of interest 425 may be associated with constituent objects 430A-430N. For example, the relationship type may indicate a stable or a transient association of the object of interest 425 with one or more constituent objects 430A-430N (e.g., "includes," "employs," "contains," "has," etc.). Accordingly, the rules engine 145 may utilize these rules to identify one or more data constituent objects 430A-430N that are associated by one or more relationships of the specified types with the object of interest 425. Upon identifying the constituent objects 430A-430N, the geolocation request processing server 135 may employ the above-described procedure to identify one or more data sources that are directly or indirectly (i.e., through secondary objects 210A-210N) associated with at least a subset of the identified constituent objects 430A-430N.

In some implementations, the geolocation request processing server 135 may query the identified data sources in order to extract the geolocation information of each of the constituent objects 430A-430N for the point of time or the period of time specified by the geolocation request. Upon extracting the geolocation information, the geolocation request processing server 135 may invoke the rules engine 145 in order to process the extracted geolocation information and employ the above-described procedure to determine geolocations of each of the constituent objects 430A-430N for the point of time or the period of time specified by the geolocation request 140. Determining geolocations of each of the constituent objects 430A-430N may involve interpolating or extrapolating the geolocation data retrieved from one or more data sources, computing priority values for each of the data sources, resolving conflicts based on the computed priority values, and computing confidence values associated with the computed geolocations, as described in more detail herein above.

The geolocation request processing server 135 may then utilize the geolocations of each of the constituent objects 430A-430N for determining the geolocation of the composite object 325 for the point of time or the period of time specified by the geolocation request 140. In some implementations, if at least a threshold number of the constituent objects 430A-430K are located within a threshold distance of each other, the geolocation of the composite object 325 is assumed to be the center of the geolocations of such constituent objects. For example, a significant number of employees of an organization are expected to be at the office during the business hours.

In some implementations, the composite object may represent a moving real-life entity (e.g., a fleet comprising multiple ships). Thus, the location, at a given point in time, of the composite object representing the moving real-life entity may be assumed to be the center of the geolocations of its constituent objects at the given point in time. For example, the location of a moving fleet may be assumed to be the center of locations of the ships composing the fleet.

In some implementations, the composite object may represent a short-living real-life event (e.g., a conference comprising a plurality of participants). Thus, the location of the composite object representing the event may be assumed to be the center of the geolocations of its constituent objects. For example, the location of a conference may be assumed to be the center of locations of the conference participants.

In some implementations, the composite object may represent a short-living dynamic real-life entity which (e.g., a natural disaster response operation). Thus, the location, at a given point in time, of the composite object representing the moving real-life entity may be assumed to be the center of the geolocations of its constituent objects at the given point in time. For example, the location of a wildfire response operation may be assumed to be the center of locations, at a given point in time, of the firefighters participating in the response operation.

As noted herein above, upon determining the geolocation 150 of the composite object 325, the geolocation request processing server 135 may generate a geolocation response 155, which may be returned to the requesting client application. In some implementations, a record reflecting the geolocation response 145 may be appended to the geolocation database 160.

In some implementations, the computed geolocations of a moving composite object may be utilized for triggering geofencing alerts. Accordingly, a geofencing alert may be triggered when a composite object of interest moves into, leaves, approaches by a threshold distance, or moves at least a threshold distance from a specified location. For example, a geofencing alert may be triggered when a natural disaster response operation approaches a certain location. The alert triggering conditions may be specified by one or more configurable rules. An alert may be triggered in a form of a message sent over a communication network to one or more specified recipients.

Furthermore, in some implementations, the computed geolocations of a moving composite object may be utilized as a dynamic geofence. Thus, a dynamic geofencing alert may be triggered when an object of interest moves into, leaves, approaches by a threshold distance, or moves at least a threshold distance from a location of the composite object of interest that acts as the dynamic geofence. For example, a dynamic geofencing alert may be triggered when a certain ship approaches a fleet that acts as the moving geofence.

In some implementations, the computed geolocations of elementary and composite objects may be utilized for inferring various relationships between an elementary object (e.g., an individual) and a composite object (e.g., an organization). For example, one or more rules 150 may specify one or more conditions for inferring a relationship of a specified type between one or more elementary objects and a composite object. In particular, one or more rules 150 may specify a schedule (e.g., business hours) and a threshold number of hours during the scheduled period of times. Responsive to determining that the geolocation of an elementary object (e.g., an individual) matches the geolocation of a composite object (e.g., an organization) for at least the threshold number of hours during one or more scheduled period of times, the geolocation request processing server may infer an ontology-specified relationship (e.g., "employed by") between the elementary object and the composite object.

In some implementations, the computed geolocations of elementary and composite objects may be utilized for inferring various relationships between two or more composite objects (e.g., organizations). For example, one or more rules 150 may specify one or more conditions for inferring a relationship of a specified type between one or two or more composite objects. In particular, one or more rules 150 may specify a schedule (e.g., business hours) and a threshold number of hours during the scheduled period of times. Responsive to determining that the geolocation of at least a threshold number of elementary objects (e.g., individuals) associated, by ontology-specified relationships (e.g., "employed by") with one composite object (e.g., the first organization) matches the geolocation of another composite object (e.g., the second organization) for at least the threshold number of hours during one or more scheduled period of times, the geolocation request processing server may infer an ontology-specified relationship (e.g., "collaborating with") between the elementary object and the composite object.

Figure 5:
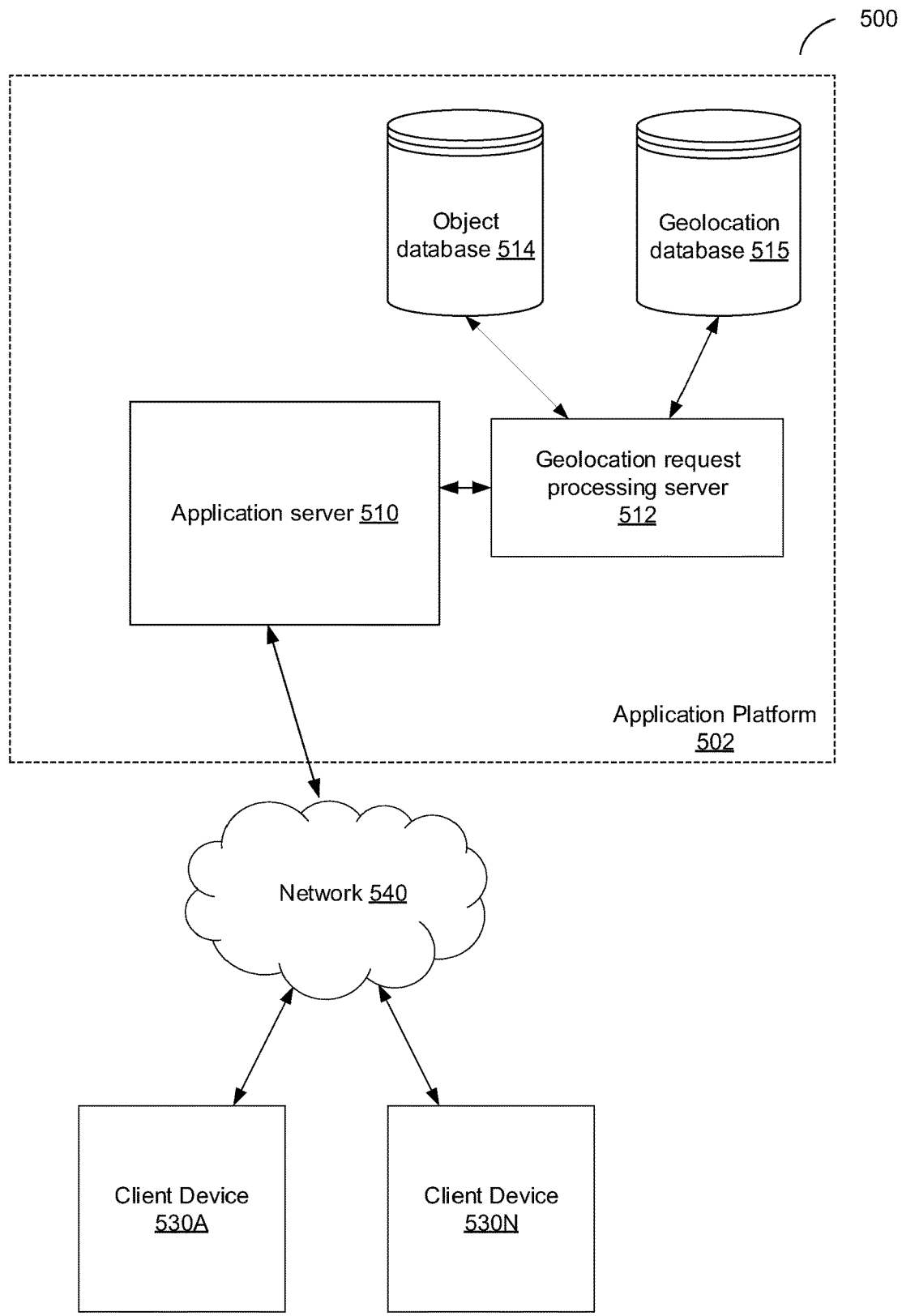
FIG. 5 is a block diagram illustrating a distributed computing system in which the systems and method described herein may operate.

FIG. 5 is a block diagram illustrating a distributed computing system in which the systems and method described herein may operate. Distributed computing system 500 may include one or more client devices 530 and an application platform 502, which may communicate with each other via network 540. Computer system 1400 of FIG. 14 may be one example of any of client devices 530 or a server(s) in the application platform 502. Network 540 may include, for example, the Internet, intranets, extranets, wide area networks (WANs), local area networks (LANs), wired networks, wireless networks, or other suitable networks, etc., or any combination of two or more such networks.

Client devices 530 may include computer systems embodied in the form of desktop computers, laptop computers, personal digital assistants, cellular telephones, smartphones, set-top boxes, music players, web pads, tablet computer systems, game consoles, electronic book readers, or other devices with similar capability.

Application platform 502 may include, for example, one or more server computers or any other system providing computing capability. Alternatively, application platform 502 may employ a plurality of computing devices that may be arranged, for example, in one or more clusters or other arrangements. Such computing devices may be positioned in a single location or may be distributed among many different geographical locations. For example, application platform 502 may include a plurality of computing devices that together may comprise a hosted computing resource, a grid computing resource and/or any other distributed computing arrangement. In some cases, application platform 502 may correspond to an elastic computing resource where the allotted capacity of processing, network, storage, or other computing-related resources may vary over time.

In some implementations, application platform 502 may include one or more application servers 510, the geolocation request processing server 512, the object database 514, and the geolocation database 515 implemented in accordance with one or more aspects of the present disclosure. Various other functional and/or infrastructure components, such as presentation layer servers, load balancers, firewalls, routers, switches, etc. are omitted from FIG. 5 for clarity and conciseness. Application servers 510 may be employed to deliver functionality of various business applications, as described in more detail herein below with reference to FIGS. 7-10. The geolocation request processing server may implement the rules engine 145 of FIG. 1 and may perform various functions as described in more detail herein above with reference to FIGS. 1-4.

In an illustrative example, the application server 510 may transmit, to the geolocation request processing server 512, a geolocation request originated by an application running on the application server 510 in response to a user input received via the client device 530. The geolocation request may include one or more parameters specifying an identifier of the object of interest, an identifier of the time point or period for which the geolocation(s) of the object of interest is sought, etc. Responsive to receiving the geolocation request, the geolocation request processing server 512 may parse the parameters of the geolocation request in order to identify the object of interest and the time specified by the geolocation request. In some implementations, the geolocation request processing server 512 may then query the geolocation database 515 in an attempt to service the incoming geolocation request using the geolocation data cached by the geolocation database 515. Should the requisite geolocation information be cached by the geolocation database 515, the geolocation request processing server 512 may generate a geolocation response and return it to the requesting application.

Otherwise, upon receiving a "cache miss" response from the geolocation database 515, the geolocation request processing server 512 may extract the geolocation information from one or more relevant data sources, process the extracted geolocation information and determine the geolocation of the object of interest for the point of time or the period of time specified by the geolocation request, as described in more detail herein above with reference to FIG. 1-4. Upon determining the geolocation of the object of interest, the geolocation request processing server 512 may generate a geolocation response, which may be returned to the requesting application. In some implementations, a record reflecting the geolocation response may be appended to the geolocation database 515, which may serve as a cache for storing the geolocation data extracted from the data sources in response to incoming geolocation requests.

Figure 6:
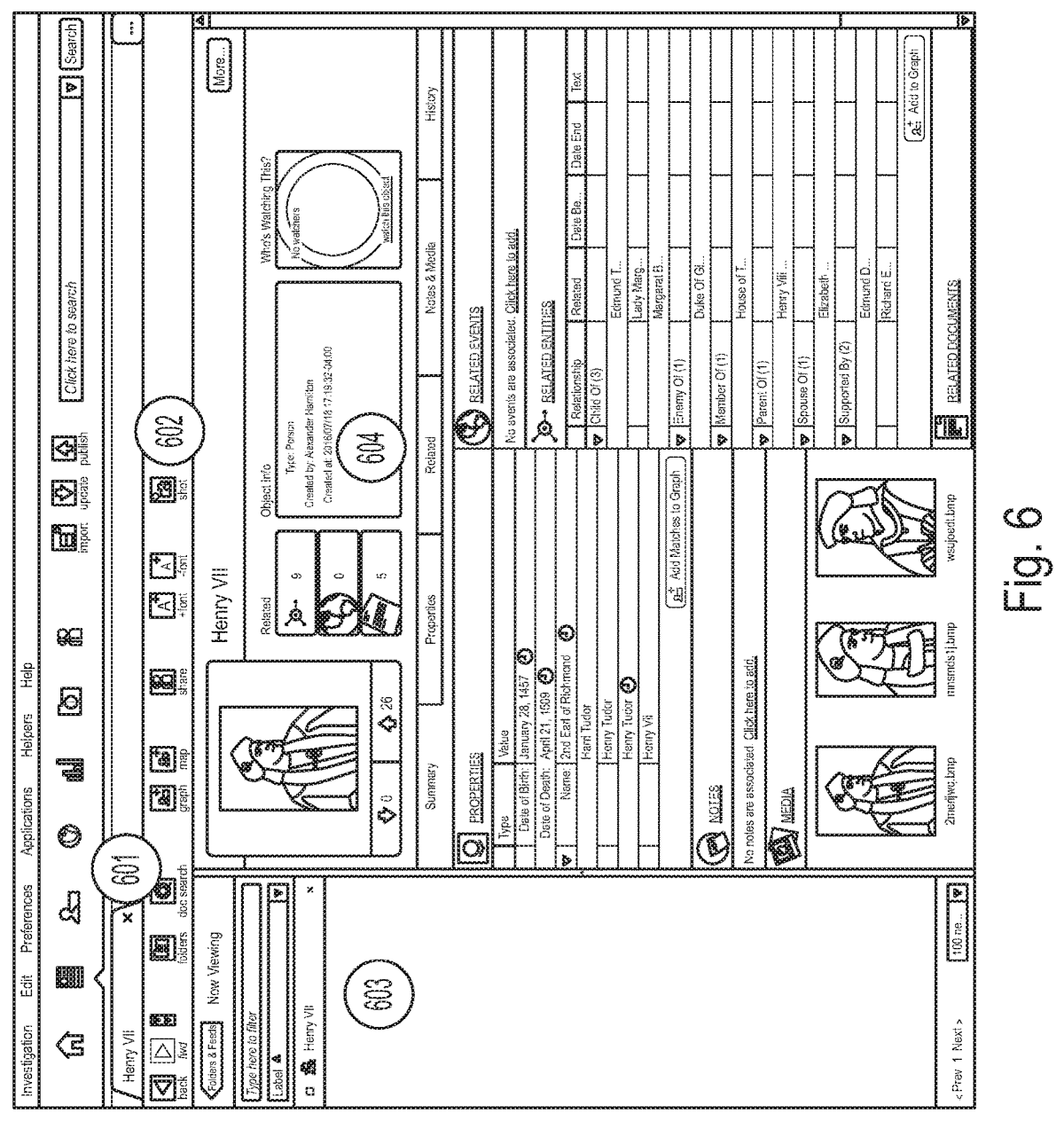

FIG. 6 schematically illustrates the main screen of the browser application which may be hosted by application platform 502 of FIG. 5, in accordance with one or more aspects of the present disclosure. The browser application is a virtual dossier associated with one or more artifacts (e.g., projects, interactive maps, or any other sets of hierarchically organized data objects). The browser application may be used to view detailed information on one or more objects, edit object properties, add notes, and view a history of changes that were made to the object. The detailed information displayed by the browser application may include the geolocation data specifying the geographical coordinates of the objects at the specified time points or periods. The geolocation data may be obtain by retrieving and processing geolocation information from one or more geolocation data sources, as described in more detail herein above with reference to FIGS. 1-4.

Additionally, the user may set up triggers and feeds to monitor changes or messages related to one or more objects. The browser application may include various graphical user interface (GUI) controls, e.g., browser tabs 601 for switching between artifacts (e.g., documents) and folders. The browser toolbar 602 may include various icons associated with tasks that may be performed in the artifacts. Browser panel 603 may include a list of objects in the currently selected folders. The browser subtabs 606 may be utilized to view and modify the currently selected objects.

Figure 7:
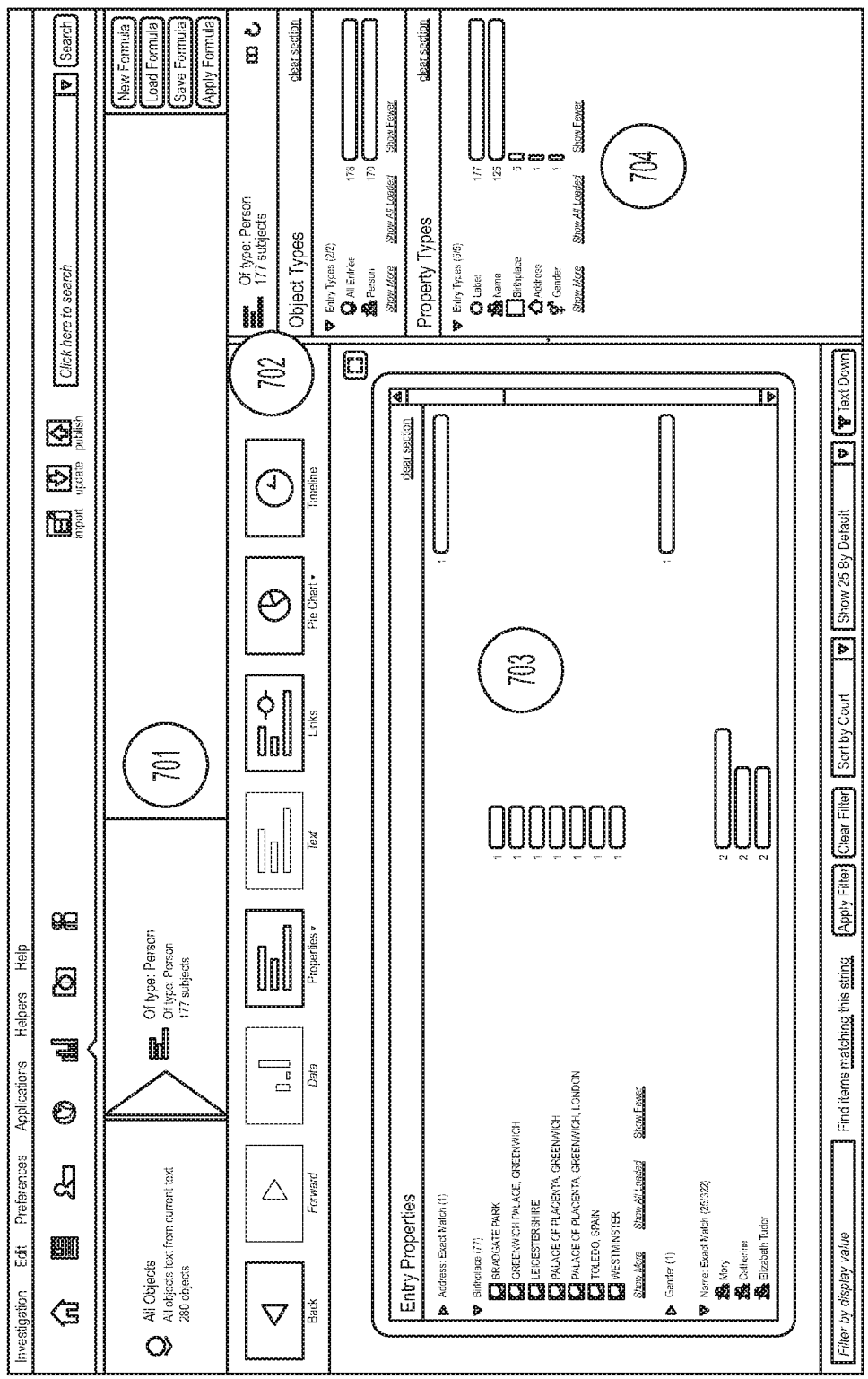
FIG. 7 schematically illustrates the main screen of the object explorer application which may be hosted by an application platform 502, in accordance with one or more aspects of the present disclosure.

FIG. 7 schematically illustrates the main screen of the object explorer application which may be hosted by application platform 502 of FIG. 5, in accordance with one or more aspects of the present disclosure. The object explorer application allows the user to view the entire dataset, filter the data by using the visualization, and perform targeted actions on the resulting object. The objects of the dataset may elementary objects and/or composite objects. The detailed object information displayed by the object explorer application may include the geolocation data specifying the geographical coordinates of the objects at the specified time points or periods. The geolocation data may be obtain by retrieving and processing geolocation information from one or more geolocation data sources, as described in more detail herein above with reference to FIGS. 1-4.

The object explorer application may include various graphical user interface (GUI) controls, e.g., the formula panel 701 for creating and working with formulas and object sets. The instrument panel 702 allows the user to specify display options for the visualization of the dataset. The visualization panel 703 allows the user to review the selected objects. The preview panel 703 allows the user to derive new object sets and produce histograms from the selected data.

Figure 8:
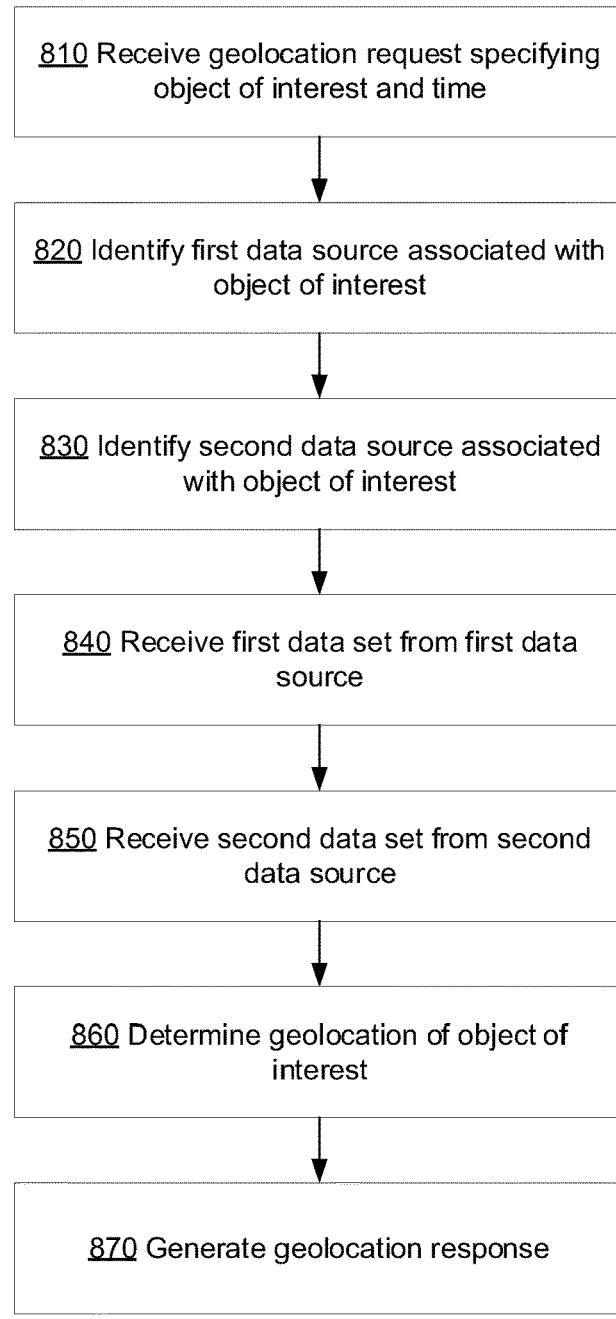
FIG. 8 depicts a flowchart of an example method of determining geolocations of objects based on information retrieved from heterogeneous data sources, in accordance with one or more aspects of the present disclosure.

FIG. 8 depicts a flowchart of an example method of determining geolocations of objects based on information retrieved from heterogeneous data sources, in accordance with one or more aspects of the present disclosure. Method 800 and/or each of its individual functions, routines, subroutines, or operations may be performed by one or more processors of the computer system (e.g., the example computer system 1000 of FIG. 10) implementing the method. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other.

At block 810, a computer system implementing the method may receive a geolocation request. The geolocation request may identify an object of interest and the time point or period or for which the geolocation of the object of interest is sought.

At block 820, the computer system may identify a first data source associated with the object by a relationship of one or more types specified by one or more data source identification rules. In one example, identifying the first data source may involve identifying a secondary object associated with the object of interest by relationships of one or more types specified by the data source identification rules; the types of relationships may indicate a stable or a transient physical association of the object of interest with the secondary object (e.g., "possesses," "uses," "carries," "rides," "collocated with," "visits," "stays at," etc.), such that the location of the object of interest may, at least at certain times, match a location of the secondary object (e.g., a person may carry a mobile phone equipped with a GPS sensor and/or ride a car equipped with a GPS navigator). Upon identifying the secondary object, the computer system may identify a data source associated with the secondary object by relationships (e.g., "location tracked by") of one or more types specified by the data source identification rules.

In another example, identifying the first data source may involve identifying a data source directly associated with the object of interest by relationships (e.g., "location tracked by") of one or more types specified by the data source identification rules, as described in more detail herein above.

At block 830, the computer system may identify a second data source associated with the object by a relationship of one or more types specified by one or more data source identification rules.

At block 840, the computer system may receive, from the first data source, a first dataset including a first data item specifying a first time identifier and a first geolocation. In one example, the first time identifier may fall within a predetermined or dynamically defined time period that includes the point or period of time specified by the geolocation request. In another example, the first time identifier may precede or follow, by a predetermined or dynamically defined time period, the point or period of time specified by the geolocation request.

At block 850, the computer system may receive, from the second data source, a second dataset including a second data item specifying a second time identifier and a second geolocation. In one example, the second time identifier may fall within a predetermined or dynamically defined time period that includes the point or period of time specified by the geolocation request. In another example, the second time identifier may precede or follow, by a predetermined or dynamically defined time period, the point or period of time specified by the geolocation request.

At block 860, the computer system may determine, by applying one or more geolocation identification rules to the first dataset and the second dataset, the geolocation of the object of interest and a corresponding time identifier. The time identifier may be computed based on the first time identifier associated with the first data item and/or the second time identifier associated with the second data item. In one example, the time identifier may fall within a predetermined or dynamically defined time period that includes the point or period of time specified by the geolocation request. In another example, the time identifier may precede or follow, by a predetermined or dynamically defined time period, the point or period of time specified by the geolocation request.

In one example, determining the geolocation of the object of interest may involve interpolating the geolocation data retrieved from one or more data sources. In another example, determining the geolocation of the object of interest may involve extrapolating the geolocation data retrieved from one or more data sources, as described in more detail herein above.

In yet another example, determining the geolocation of the object of interest may involve determining priority values to the identified data sources. The priority values may be utilized for resolving eventual conflicts between geolocation data items retrieved from two or more data sources, as described in more detail herein above.

In yet another example, determining the geolocation of the object of interest may involve computing the confidence value associated with the geolocation of the object of interest for the specified point of time or the period of time, as described in more detail herein above.

At block 870, the computer system may generate a geolocation response identifying the geolocation of the object of interest for the specified point or period of time, and the method may terminate.

Figure 9:
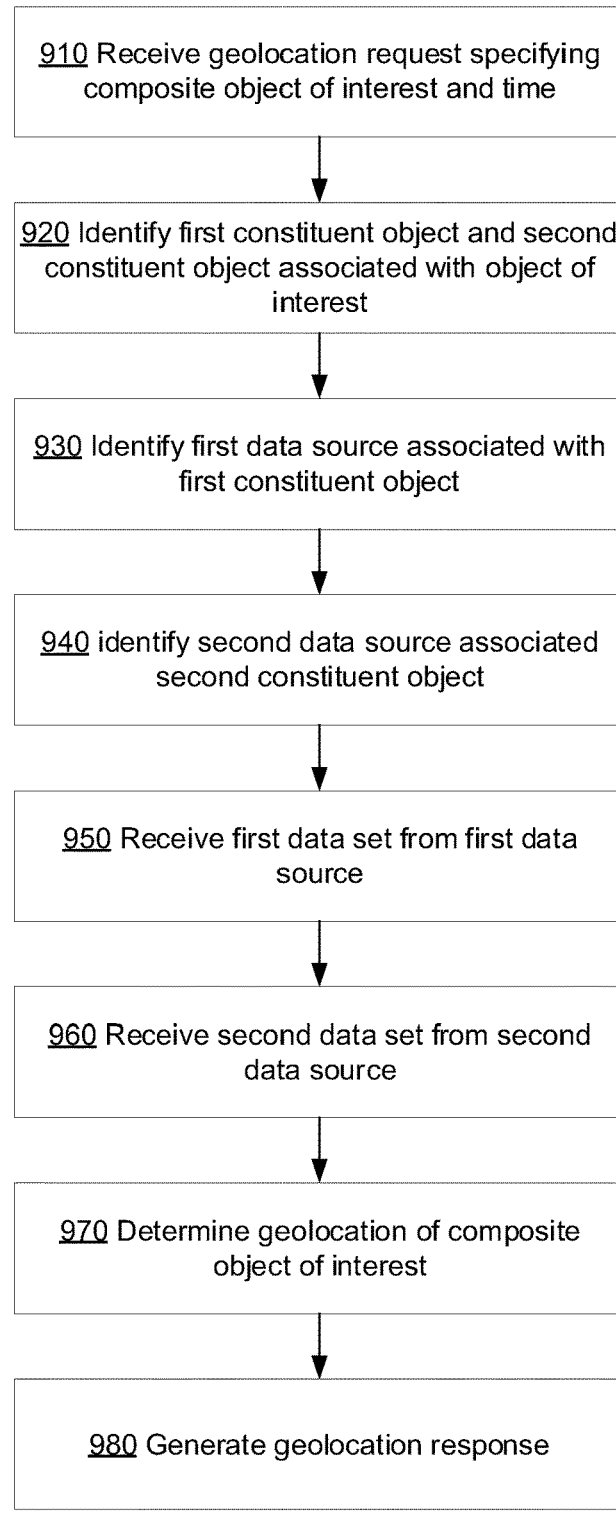
FIG. 9 depicts a flowchart of an example method of determining geolocations of composite objects based on information retrieved from heterogeneous data sources, in accordance with one or more aspects of the present disclosure.

FIG. 9 depicts a flowchart of an example method of determining geolocations of composite objects based on information retrieved from heterogeneous data sources, in accordance with one or more aspects of the present disclosure. Method 900 and/or each of its individual functions, routines, subroutines, or operations may be performed by one or more processors of the computer system (e.g., the example computer system 1000 of FIG. 10) implementing the method. In certain implementations, method 900 may be performed by a single processing thread. Alternatively, method 900 may be performed by two or more processing threads, each thread executing one or more individual functions, routines, subroutines, or operations of the method. In an illustrative example, the processing threads implementing method 900 may be synchronized (e.g., using semaphores, critical sections, and/or other thread synchronization mechanisms). Alternatively, the processing threads implementing method 900 may be executed asynchronously with respect to each other.

At block 910, a computer system implementing the method may receive a geolocation request. The geolocation request may identify an object of interest and the time point or period or for which the geolocation of the object of interest is sought. The object of interest may be represented by a composite object, which may include two or more constituent objects, as described in more detail herein above.

At block 920, the computer system may identify a first constituent object and a second constituent object associated with the composite object specified by the geolocation request. In one example, identifying the first constituent object may involve identifying an object associated with the composite object of interest by relationships of one or more types specified by the constituent object identification rules; the types of relationships may indicate a stable or a transient association of the composite object of interest with the constituent object (e.g., "includes," "employs," "contains," "has," etc.), as described in more detail herein above.

At block 930, the computer system may identify a first data source associated with the first constituent object by a relationship of one or more types specified by one or more data source identification rules. In one example, identifying the first data source may involve identifying a secondary object associated with the first constituent object by relationships of one or more types specified by the data source identification rules; the types of relationships may indicate a stable or a transient physical association of the object of interest with the secondary object (e.g., "possesses," "uses," "carries," "rides," "collocated with," "visits," "stays at," etc.), such that the location of the object of interest may, at least at certain times, match a location of the secondary object (e.g., a person may carry a mobile phone equipped with a GPS sensor and/or ride a car equipped with a GPS navigator). Upon identifying the secondary object, the computer system may identify a data source associated with the secondary object by relationships (e.g., "location tracked by") of one or more types specified by the data source identification rules.

In another example, identifying the first data source may involve identifying a data source directly associated with the first constituent object by relationships (e.g., "location tracked by") of one or more types specified by the data source identification rules, as described in more detail herein above.

At block 940, the computer system may identify a second data source associated with the second constituent object by a relationship of one or more types specified by one or more data source identification rules.

At block 950, the computer system may receive, from the first data source, a first dataset including a first data item specifying a first time identifier and a first geolocation of the first constituent object. In one example, the first time identifier may fall within a predetermined or dynamically defined time period that includes the point or period of time specified by the geolocation request. In another example, the first time identifier may precede or follow, by a predetermined or dynamically defined time period, the point or period of time specified by the geolocation request.

At block 960, the computer system may receive, from the second data source, a second dataset including a second data item specifying a second time identifier and a second geolocation of the second constituent object. In one example, the second time identifier may fall within a predetermined or dynamically defined time period that includes the point or period of time specified by the geolocation request. In another example, the second time identifier may precede or follow, by a predetermined or dynamically defined time period, the point or period of time specified by the geolocation request.

At block 970, the computer system may determine, by applying one or more geolocation identification rules to the first dataset and the second dataset, the geolocation of the composite object and a corresponding time identifier. In some implementations, if at least a threshold number of the constituent objects are located within a threshold distance of each other, the geolocation of the composite object is assumed to be the center of the geolocations of such constituent objects. For example, a significant number of employees of an organization are expected to be at the office during the business hours, as described in more detail herein above.

The time identifier associated with the computed geolocation may be determined based on the first time identifier associated with the first data item and/or the second time identifier associated with the second data item. In one example, the time identifier may fall within a predetermined or dynamically defined time period that includes the point or period of time specified by the geolocation request, as described in more detail herein above.

At block 980, the computer system may generate a geolocation response identifying the geolocation of the composite object of interest for the specified point or period of time, and the method may terminate.

Figure 10:
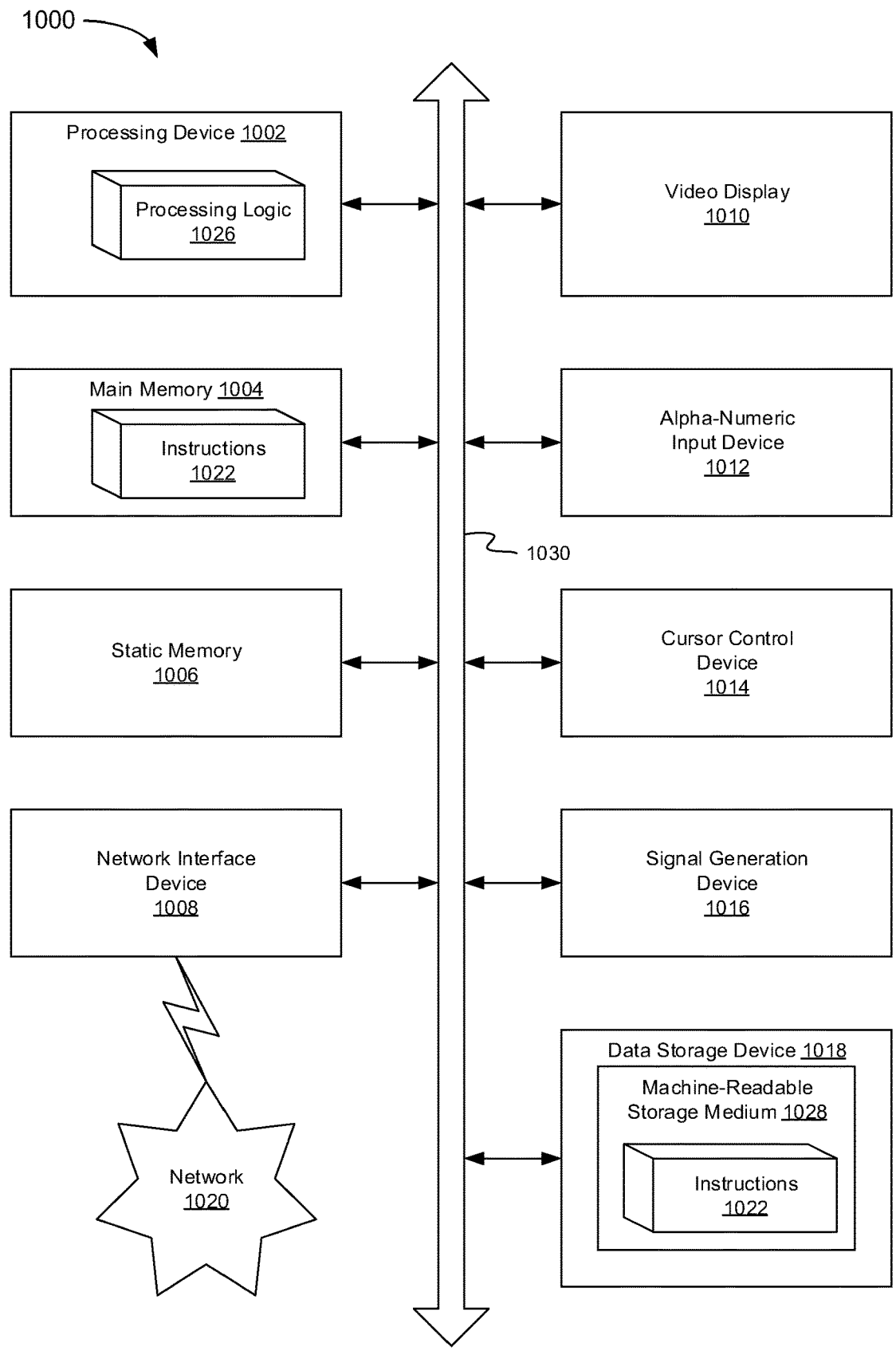
FIG. 10 is a block diagram illustrating a computer system, according to an implementation.

FIG. 10 illustrates a diagrammatic representation of a machine in the exemplary form of a computer system 1000 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server distributed computing system, or as a peer machine in a peer-to-peer (or distributed) distributed computing system. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some implementations, computer system 1000 may be representative of a computing device, such as a server of application platform 102 running rules-based dataset cleaning system 110 or a client computing system 130.

The exemplary computer system 1000 includes a processing device 1002, a main memory 1004 (e.g., read-only memory (ROM), flash memory, dynamic random access memory (DRAM) (such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-accessible storage medium 1028, on which is stored one or more set of instructions 1022 (e.g., software) embodying any one or more of the methodologies of functions described herein. The instructions 1022 may also reside, completely or at least partially, within the main memory 1004 and/or within the processing device 1002 during execution thereof by the computer system 1000; the main memory 1004 and the processing device 1002 also constituting machine-accessible storage media. The instructions 1022 may further be transmitted or received over a network 1020 via the network interface device 1008.

The machine-readable storage medium 1028 may also be used to store instructions 1022 of rules-based dataset cleaning, as described herein. While the machine-readable storage medium 1028 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   identifying, by a computer system, a secondary object associated, by a first relationship specified by a hierarchical ontology, with an object of interest, wherein the first relationship indicates at least a transient physical association of the secondary object with the object of interest;
   identifying a first data source and a second data source that are associated, by the hierarchical ontology, with the secondary object;
   receiving from the first data source associated with the secondary object by a second relationship specified by the hierarchical ontology, a first dataset including a first data item specifying a first time identifier and a first geolocation associated with the secondary object;
   receiving, from the second data source associated with the secondary object by a third relationship specified by the hierarchical ontology, a second dataset including a second data item specifying a second time identifier and a second geolocation associated with the secondary object; and
   determining a first priority associated with the first dataset and a second priority associated with the second dataset;
   resolving, based on the first priority and the second priority, a conflict with respect to the first data item and the second data item;
   determining, by applying a first rule set associated with the ontology to the first dataset and the second dataset, a geolocation of the object of interest and a corresponding time identifier; and
   determining, based on an attribute of a fourth relationship between the data source and the object of interest, a confidence level associated with the geolocation of the object of interest.

2. The method of claim 1, further comprising:
   storing the geolocation of the object of interest and the corresponding time identifier in an object database implementing the ontology.

3. The method of claim 1, further comprising:
   receiving a geolocation data request specifying the object of interest; and
   transmitting a response specifying the geolocation of the object of interest and the corresponding time identifier.

4. The method of claim 1, wherein determining the geolocation of the object of interest further comprises:
   interpolating the geolocation of the object of interest at a time frame between a first time identified by the first time identifier and a second time identified by the second time identifier.

5. A system, comprising:
   memory; and
   one or more processors coupled to the memory, the one or more processors configured to:
      identify a secondary object associated, by a first relationship specified by a hierarchical ontology, with an object of interest, wherein the first relationship indicates at least a transient physical association of the secondary object with the object of interest;
      identify a first data source and a second data source that are associated, by the hierarchical ontology, with the secondary object;
      receive, from a first data source associated with the secondary object by a second relationship specified by the hierarchical ontology, a first dataset including a first data item specifying a first time identifier and a first geolocation associated with the secondary object;
      receive, from a second data source associated with the secondary object by a third relationship specified by the hierarchical ontology, a second dataset including a second data item specifying a second time identifier and a second geolocation associated with the secondary object;
      determine a first priority associated with the first dataset and a second priority associated with the second dataset;
      resolve, based on the first priority and the second priority, a conflict with respect to the first data item and the second data item;
      determine, by applying a rule set associated with the ontology to the first dataset and the second dataset, a geolocation of the object of interest and a corresponding time identifier; and
      determine, based on an attribute of a fourth relationship between the data source and the object of interest, a confidence level associated with the geolocation of the object of interest.

6. The system of claim 5, wherein the one or more processors are further configured to:
   store the geolocation of the object of interest and the corresponding time identifier in an object database implementing the ontology.

7. The system of claim 5, wherein the one or more processors are further configured to:
   receive a geolocation data request specifying the object of interest; and
   transmit a response specifying the geolocation of the object of interest and the corresponding time identifier.

8. The system of claim 5, wherein determining the geolocation of the object of interest further comprises:

interpolating the geolocation of the object of interest at a time frame between a first time identified by the first time identifier and a second time identified by the second time identifier.

9. A non-transitory computer readable storage medium comprising executable instructions that, when executed by a computer system, cause the computer system to:

identify a secondary object associated, by a first relationship specified by a hierarchical ontology, with an object of interest, wherein the first relationship indicates at least a transient physical association of the secondary object with the object of interest;

identify a first data source and a second data source that are associated, by the hierarchical ontology, with the secondary object;

receive, from the first data source associated with the secondary object by a second relationship specified by the hierarchical ontology, a first dataset including a first data item specifying a first time identifier and a first geolocation associated with the secondary object;

receive, from the second data source associated with the secondary object by a third relationship specified by the hierarchical ontology, a second dataset including a second data item specifying a second time identifier and a second geolocation associated with the secondary object;

determine a first priority associated with the first dataset and a second priority associated with the second dataset;

resolve, based on the first priority and the second priority, a conflict with respect to the first data item and the second data item;

determine, by applying a rule set associated with the ontology to the first dataset and the second dataset, a geolocation of the object of interest and a corresponding time identifier; and determine, based on an attribute of a fourth relationship between the data source and the object of interest, a confidence level associated with the geolocation of the object of interest.

10. The non-transitory computer readable storage medium of claim 9, further comprising executable instructions that, when executed by the computer system, cause the computer system to:

store the geolocation of the object of interest and the corresponding time identifier in an object database implementing the ontology.

11. The non-transitory computer readable storage medium of claim 9, further comprising executable instructions that, when executed by the computer system, cause the computer system to:

receive a geolocation data request specifying the object of interest; and transmit a response specifying the geolocation of the object of interest and the corresponding time identifier.

* * * * *